(12) United States Patent
Theimer et al.

(10) Patent No.: US 6,240,363 B1
(45) Date of Patent: May 29, 2001

(54) NAVIGATION METHOD, IN PARTICULAR FOR VEHICLES

(75) Inventors: Wolfgang Theimer, Bochum (DE); Heikki Laine, Tampere (FI); Hannu Hakala, Hameenkyro (FI); Jari Kaikkonen, Kangasala (FI); Harri Koskinen, Tampere (FI); Harri Valio, Pirkkala (FI)

(73) Assignee: Nokia Mobile Phones, Limited, Espoo (FI)

( * ) Notice: Subject to any disclaimer, the term of this patent is extended or adjusted under 35 U.S.C. 154(b) by 0 days.

(21) Appl. No.: 09/238,380

(22) Filed: Jan. 27, 1999

(30) Foreign Application Priority Data

Jan. 30, 1998 (DE) ............................................. 198 03 659

(51) Int. Cl.[7] .................................................. G01C 21/20
(52) U.S. Cl. ........................ 701/210; 701/207; 701/208; 701/209
(58) Field of Search .......................... 701/200, 206–216; 342/357.01–357.17

(56) References Cited

U.S. PATENT DOCUMENTS

| 4,992,947 | * | 2/1991 | Nimura et al. ...................... 701/210 |
| 5,016,002 | | 5/1991 | Levanto . |
| 5,311,434 | | 5/1994 | Tamai . |
| 5,638,280 | * | 6/1997 | Nishimura et al. .................. 701/209 |
| 5,652,706 | * | 7/1997 | Morimoto et al. ................... 701/210 |
| 5,757,289 | * | 5/1998 | Nimura et al. ................... 701/209 X |
| 5,852,483 | | 12/1998 | Newstead et al. . |
| 5,902,349 | * | 5/1999 | Endo et al. ...................... 701/209 X |

FOREIGN PATENT DOCUMENTS

| 195 47 574 A1 | 10/1996 | (DE) . |
| 195 44 157A1 | 5/1997 | (DE) . |
| 0 833 292 A1 | 4/1998 | (EP) . |
| WO 93/13385 | 7/1993 | (WO) . |
| WO 97/02469 | 1/1997 | (WO) . |

* cited by examiner

Primary Examiner—Bernarr E. Gregory
(74) Attorney, Agent, or Firm—Perman & Green, LLP

(57) ABSTRACT

The invention relates to a navigation method, in particular for vehicles, in which a route (R) from a starting point ($z_1$) to a destination ($z_n$) is determined and stored, in which the current position (z(t)) is determined, and in which direction information corresponding to the route (R) is indicated. In order to allow the user to be guided to his destination, if he leaves the route, without using map material, the invention provides for a direction which leads back to the route to be indicated, if the current position is not on the route.

15 Claims, 4 Drawing Sheets

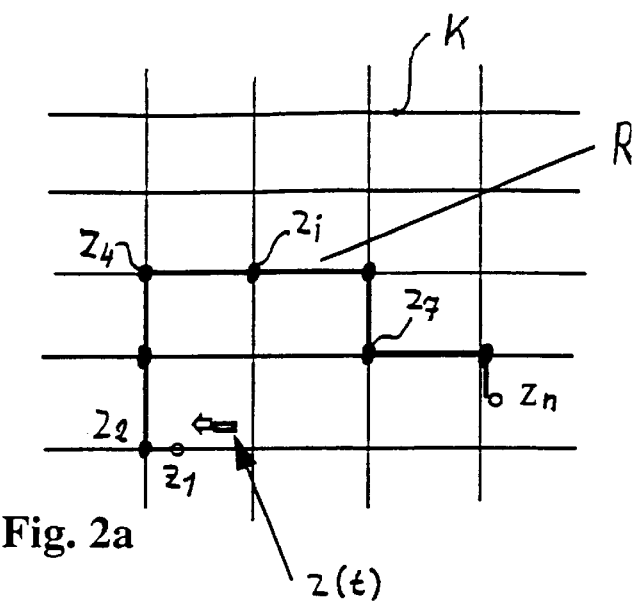
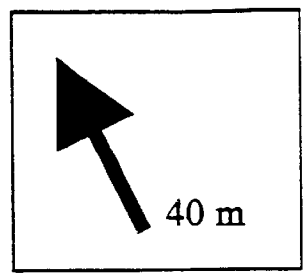
Fig. 2a
Fig. 2b
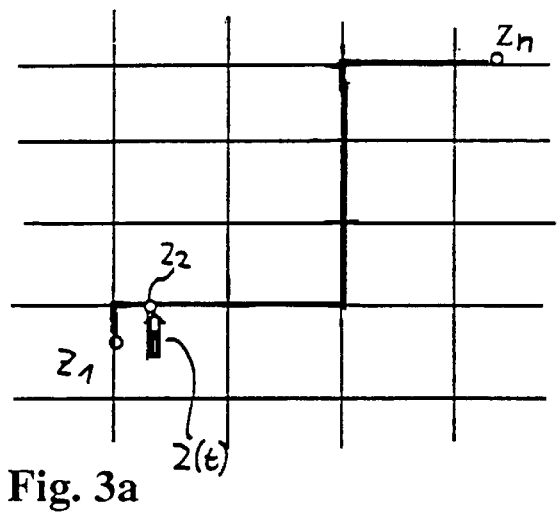
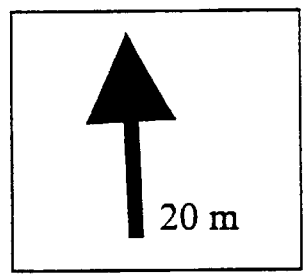
Fig. 3a
Fig. 3b
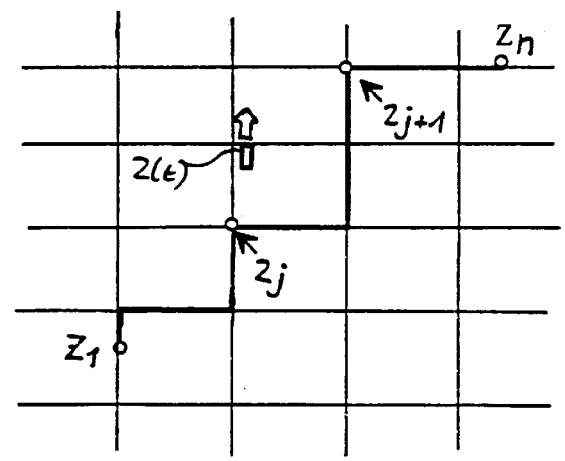
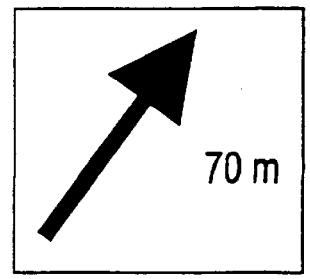
Fig. 4a
Fig. 4b

NAVIGATION METHOD, IN PARTICULAR FOR VEHICLES

The invention relates to a navigation method, in particular a navigation method which is used in vehicles.

In the case of conventional vehicle navigation systems, all the necessary map material is normally located in the vehicle and is stored, for example, on CD-ROM. At the start of a journey, the driver can then enter the starting point and the destination in the navigation unit, in which the desired route is then calculated at the start of a journey. During the journey, the driver is then guided to his destination with the aid of direction arrows on a display unit or using a map display. In order to allow the required direction information to be displayed to the driver all the time in this case, the current vehicle position is determined continuously during the journey. This can be done, for example, via an integrated navigation system or using a satellite-based position system (GPS—Global Positioning System).

If the driver strays off the originally calculated journey route, then the known vehicle navigation system intrinsically has the capability to calculate a new route to the predetermined destination on the basis of the current position, which is not on the stored route, and using the map material available in the vehicle, and to guide the driver in accordance with the newly calculated route to his destination.

Thus, the navigation method used in this known vehicle navigation system continuously requires access to appropriate map material, which must therefore be stored, and must be accessible to the navigation unit, in a suitable manner.

In order to ensure that reliable guidance is always provided to the desired destination in this case, the map material must be continually replaced in order, to some extent, to keep it at the latest standard. A memory unit, for example a CD-Rom drive, is in this case required for access to the map material, and occupies a relatively large amount of space.

WO 93/13385 has already disclosed a vehicle navigation apparatus having a navigation computer which uses road map data to determine a journey route to a specific destination, with said data being stored in an appropriate memory. During the journey to the desired destination, the driver is then supplied visually and/or audibly with appropriate direction of travel instructions.

If the driver and his vehicle leave the route, either voluntarily or by necessity, then he can enter a "not feasible/new route" signal via an input device, indicating to the navigation computer that it is no longer possible to continue with the proposed route, and that new route proposals should be calculated, starting from the current vehicle position. The navigation computer then uses the stored road map data to calculate a new route, with the route section which has been designated as not being feasible being ignored.

Furthermore, WO 97/02469 has disclosed a satellite-based vehicle compass, which has a satellite receiver for producing the coordinates of a current position and input means for entering the position of a desired destination. A direction of travel is determined from the destination position and the current position, and is indicated to the driver on a display unit.

In the light of this, the invention is based on the object of specifying another navigation method which allows, in particular, its user to be guided reliably to a desired destination without having to access the map material required for this purpose after determining a desired route.

This object is achieved by the navigation method according to claim 1.

Thus, according to the invention, in the case of a navigation method which can be used, in particular, in vehicles, a route from a starting point to a destination is first of all determined and stored in order then to indicate to the user, while en route from the starting point to the destination, direction information corresponding to the determined route, as long as the user's current position is on the route, while a direction which leads back to the determined route is indicated if the user's current position is not on the route, because he has left the route.

The navigation method according to the invention has the advantage over the prior art that only the map or road map information relevant to the respective current route need be stored, that is to say—when the navigation method is used in a vehicle—the individual road junctions with the respective direction of travel information, and this is then indicated whenever it is required, automatically or on request, as navigation instructions. If the user, that is to say for example the driver of a motor vehicle, leaves the route owing to a traffic jam or for other reasons, then he is guided back to the route by having indicated to him the direction in which he will return to the route.

The direction which leads back to the route is in this case preferably derived from the determined current position and stored position data relating to the route. In order in this case to indicate to the driver of a vehicle the direction which leads back to the route in a manner which can be perceived as quickly as possible, this direction is indicated relative to the vehicle.

In this case, it is particularly advantageous if the direction which leads back to the route is calculated, relative to the vehicle, from the direction of travel of the vehicle in the reference system of the route and from the direction from the current position to a selected position on the route.

The invention expediently provides in this case that the direction of travel of the vehicle is estimated from the last, preferably from the last three, vehicle positions, including the current vehicle position. Since the indication of a direction of travel of a vehicle and, in particular, its determination from three vehicle positions detected successively at approximately equal time intervals is worthwhile only if the vehicle is travelling in a straight line, the invention provides that in order to estimate the direction of travel of the vehicle, the direction from the last but one vehicle position to the last vehicle position is compared with the direction from the last vehicle position to the current vehicle position, and in that the direction from the last but one vehicle position to the current vehicle position is used as the direction of travel provided the difference between the two directions which are compared with one another is not greater than a predetermined value. Thus, according to the invention, the difference between the last two directions of travel is determined and their magnitude is compared with a predetermined tolerance value (which may be, for example, 5°) in order to decide whether the vehicle is travelling in a straight line or is following a curve. In the latter case, the estimation of the direction of travel is repeated at the earliest after the current vehicle position has been updated.

In order to keep the overall distance as short as possible, despite the diversion carried out in returning to the route, the invention provides that in order to select, on the route, a position which is suitable for returning to the route, that position on the route is determined which is closest to the current position, the distance from the current position to that position on the route which follows the closest position is compared with its distance to the closest position, and, if the closest position is closer to the following position than the current position, the closest position is selected, and otherwise the following position is selected.

Thus, the method according to the invention does not just determine the position closest to the current position, which could lead to the user being guided back to the route in the direction opposite to that desired, which would lead to an unnecessary increase in the distance travelled, but the method determines whether the user is already in the area between the closest position on the route and the position following this, and if this is the case the user is guided in a sensible manner to the latter route position.

It is particularly advantageous if in addition to the direction which leads back to the route, the distance from the current position to the route is indicated, preferably the distance to a selected position on the route.

It is particularly advantageous in this case if the indication of the information which leads back to the route is continuously updated until the route is reached and, after this, the direction information corresponding to the route is indicated.

The continual updating of the information which leads back to the route, that is to say of the distance to the selected node and the direction which leads back to the route, thus makes it possible, despite indications initially being given to a position on the route during the return to the route, for another position to be selected while on the route back, if this is found to be more favourable. Furthermore, this continual updating has the advantage that, even if the user does not comply with the information which leads back to the route, he is continuously informed whether or that he is even further away from the route, and how he can find his way back to the route.

It is particularly advantageous if the current direction information is output, if required, in response to a request signal from the user. This is particularly advantageous if the respective direction information is reported to the user only audibly. This avoids being continuously distracted, and he can thus concentrate on the traffic. Conversely, however, he can also receive the current direction information at a time at which it is actually not yet absolutely essential. Thus, for example, the user can ask what direction he must take at the next junction, even though he is still well away from it. This has the advantage that, particularly when the traffic is dense, he can position himself appropriately and in good time on the basis of the traffic flow and the navigation instructions.

Even if he has left the route, it is expedient if he is not continuously and automatically supplied with direction information since, in this case, there is not direct relationship between the direction information, that is to say between the direction which leads back to the route and the actual route travelled alongside the route. The user thus has the option to request direction information when it will disturb him the least.

A particularly advantageous refinement of the invention provides that the route is stored in the form of nodes which represent individual positions on a map, in particular road junctions, and to each of which a direction information item is assigned.

In this case, it is particularly expedient for the individual nodes on the route to be stored as GPS positions, with the individual nodes on the route being displayed in polar coordinates, preferably as complex numbers in polar coordinates, and with the current position being determined with the aid of a satellite-based position system.

This allows the navigation method according to the invention to be used with the satellite-based Global Positioning System (GPS). In addition to satellite positioning, the current position, in particular of a vehicle, can be determined even more accurately if, in addition to the satellite-based determination of the current position, integrated navigation methods with distance measurement and direction change measurement are also used.

A particularly preferred development of the invention provides that the starting point and destination of a desired route are entered, and are transmitted from a navigation device to a central data processing unit, in that appropriate map material is used in the central data processing unit to determine a route, and in that the determined route is transmitted to the navigation device requesting the route, and is stored there, and with the data being transmitted via a radio link, in particular and preferably via a data link in a cellular mobile radio network.

The calculation according to the invention in a central data processing unit which can be accessed via a data link in a cellular mobile radio network makes it possible for any user of the navigation method according to the invention to have access to the respective latest map material. In particular, it is in this case feasible for the central data processing unit even to take account of current traffic reports and to provide the user with the requested route. Using a mobile radio network for data transmission provides the user with the capability to have a new route to his destination calculated, if required, if the navigation instructions which lead back to the route are not adequate for him.

The navigation method according to the invention, which is particularly suitable for vehicles, can, however, also be carried out with a portable navigation device which is equipped with a GPS receiver for satellite positioning. For example, a user who wishes to use the navigation method according to the invention on foot as well can have a tourist route through a town determined for him, which goes past all the important sights, being guided in an appropriate manner by the navigation device. In the process, he can make any diversions he desires, and will nevertheless always be guided back to his route again.

BRIEF DESCRIPTION OF THE DRAWINGS

The invention is explained in more detail in the following text, by way of example, with reference to the drawing, in which:

FIGS. 2b, 3b and 4b show illustrations of the visual display of the situation shown in FIGS. 2a, 3a and 4a, respectively.

DETAILED DESCRIPTION OF THE INVENTION

Figure 1:
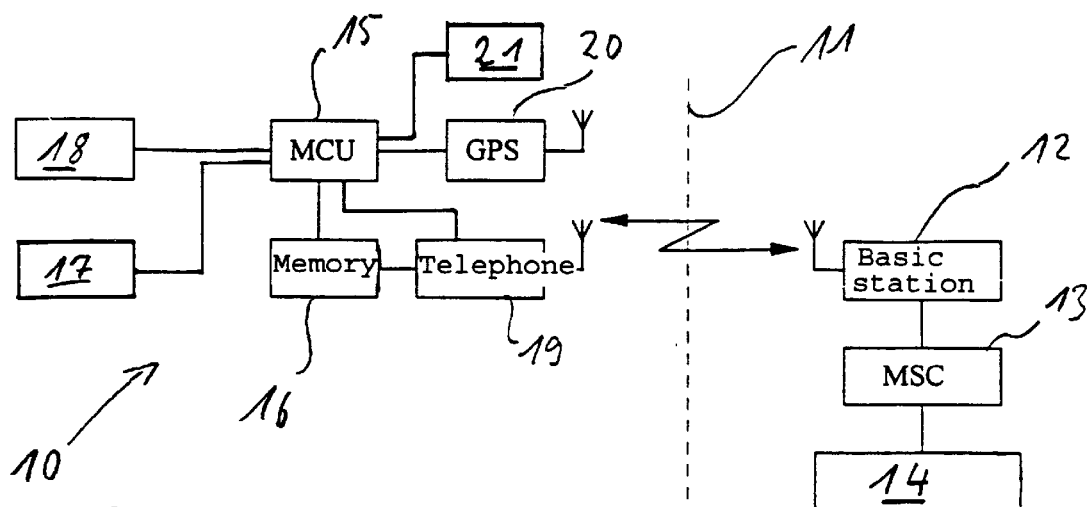
FIG. 1 shows a schematic block diagram of a navigation system for carrying out the navigation method according to the invention, FIGS. 2a, 3a and 4a each show a schematic illustration of a route in a schematic road map with a vehicle that is not on the route.

As FIG. 1 shows, a system for carrying out the navigation method according to the invention has a navigation device 10 which, via a radio interface 11, interchanges data with a base station 12 of a mobile radio network, to which a central computer 14 of a service provider is connected via an MSC unit 13 (Mobile Switching Centre). The central computer 14 of the service provider is used to calculate an optimum journey route, which can then be transmitted to the navigation device 10, on the basis of a starting and destination position using the respective latest available map material, and possibly taking account of current traffic reports.

The navigation device 10 comprises an arithmetic unit 15 which may be, for example, a microcontrol unit MCU (Micro Control Unit). The arithmetic unit 15 is equipped with a memory 16 for storing the data for a route, an input unit 17 for entering the starting and destination points of a desired route and, if required, for requesting direction information, and with an output unit 18 for outputting the respective current direction information as navigation instructions. The output unit 18 may in this case comprise, for example, a visual display unit and/or an audible announcement unit, in order to allow the desired direction information to be reported to the user of the navigation device 10.

To allow the data relating to the starting and destination points of a desired route to be transmitted to the central computer 14 of the service provider, the arithmetic unit 15 is connected to a cellular telephone 19 of a mobile radio network, which communicates with the base station 12 via the radio interface 11. The telephone 19 is in this case also connected to the memory 16, so that the data received from the telephone 19 and relating to a route can be stored directly in the memory 16.

To allow the current position of the navigation device 10 to be detected in all cases, a GPS receiver 20 is provided, which is connected to the arithmetic unit 15 in order to transmit current position data to the arithmetic unit 15 all the time. The GPS receiver 20 is in this case used for positioning on the basis of satellites using GPS (Global Positioning System). If the navigation device 10 is installed in a vehicle, an integrated navigation unit 21 can be provided instead of or, preferably, in addition to the GPS receiver 20, in each case determining the current position, originating from a starting position, on the basis of distance measurements and direction changes.

If a user, for example the driver of a vehicle, wishes to use the navigation method according to the invention for his journey from A to B, so that he is guided along the optimum route from A to B, then he enters the position data for the point A as the starting point and the position data for the point B as the destination point via the input unit 17 into the navigation device 10. These data are transmitted with the aid of the telephone 19, via the mobile radio network, to the central computer 14 of the service provider, where the route is calculated using the latest map material. The specific data relating to the route, that is to say, in addition to the starting point and destination point, also its nodes (that is to say the positions on the route to which direction instructions are assigned, such as road junctions, motorway exits and the like) are then sent back to the navigation device, where they are stored.

The route data are transmitted to the navigation device 10 in the same way in which the route request is transmitted to the service provider, for example as a short message (SMS, Short Message Service) via an appropriate mobile radio network short message service.

As FIG. 2a shows, the route R has a large number of individual nodes $z_i$, including the starting and destination points $z_1$ and $z_n$, which represent the junction points in a road network, whose map K is displayed schematically as a grid.

A direction instruction is in this case assigned to each node $z_i$, which is stored in position coordinates of an appropriate coordinate system, for example as a GPS position. The node $z_2$ in FIG. 2a is in this case assigned the direction instruction "turn right", and this instruction is also linked to the node $z_4$. At the node $z_7$, the driver is then told that he must turn left. The direction of travel instruction "continue straight on" is assigned to the fifth node, which is referred to as $z_i$ in FIG. 2a.

Figure 5:
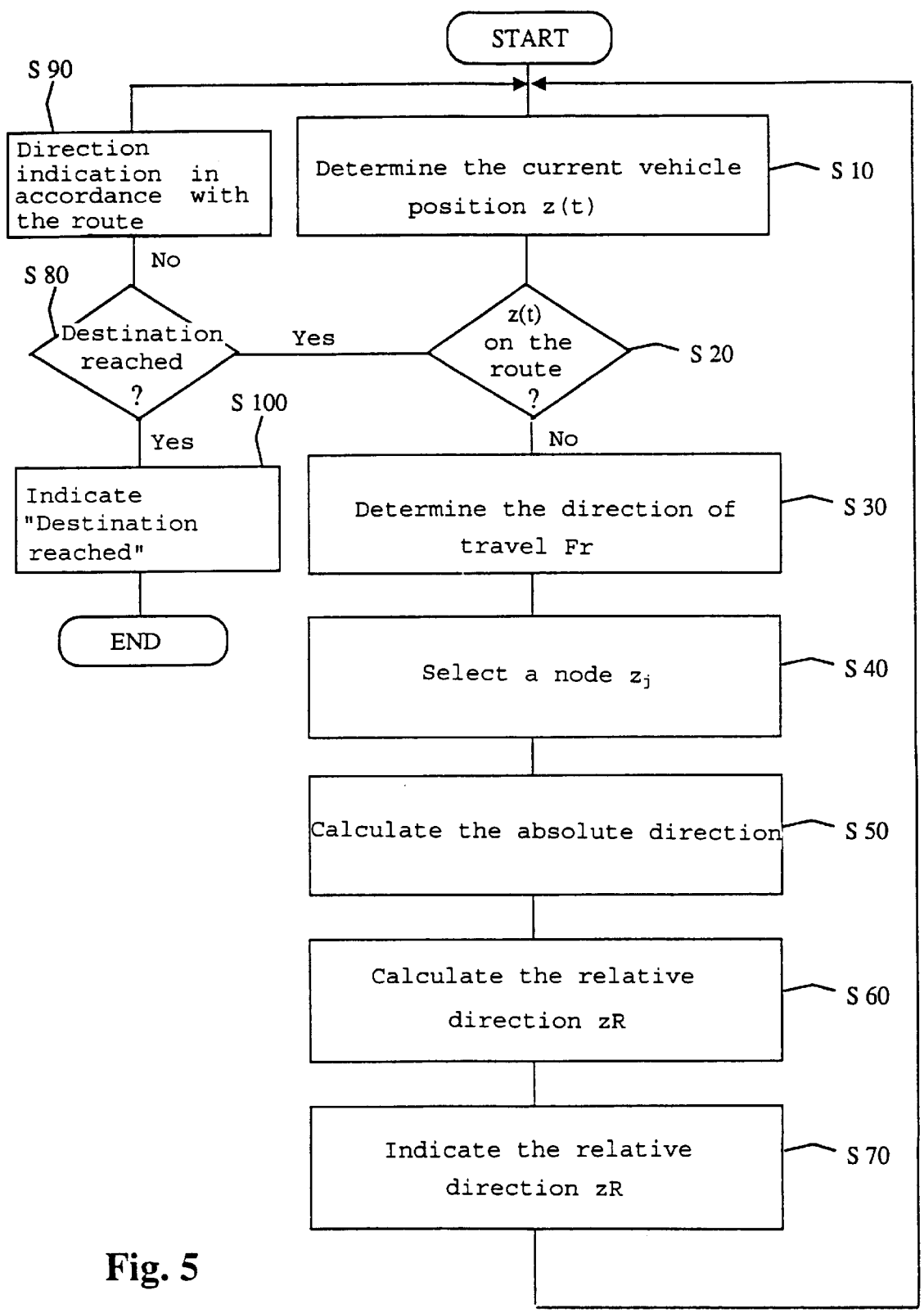
FIG. 5 shows a flowchart for calculating the direction of travel display.

Once the route has been stored in the navigation device 10, the current vehicle position is first of all determined in accordance with step S10 in FIG. 5 in order to make it possible to find out, in step S20, whether the current vehicle position z(t) is or is not on the route. If it is not on the route, then the direction of travel Fr of the vehicle is now determined, in step S30. A node $z_j$ on the route, to which the vehicle should be guided, is then selected in step S40, taking account of the shortest overall distance. The distance to the selected node $z_j$ can also be calculated in this case. In the example in FIG. 2a, this is the starting point $z_1$, which is closest to the current vehicle position z(t), on the route R.

After selecting the appropriate node $z_j$, the absolute direction from the current vehicle position z(t) to the node $z_i$, that is to say in this case $z_1$, is calculated next in step S50, in order then to calculate, in step S60, the relative direction to the node to be driven to, taking account of the direction of travel Fr.

Corresponding to step S70, the relative direction is then indicated or announced, preferably together with the distance to the node to be driven to.

As is shown in FIG. 2b, the indication comprises, for example, an arrow, to which the range details are assigned. An audible message with the direction of travel information for the driver could be, for example: "half-left forwards, 40 meters".

As soon as the vehicle is driving towards the route R, taking account of the direction of travel information and the roads that exist, the vehicle position is determined once again (step S10) in order to check in step S20 whether the route has already been reached. Steps S30 to S70 are repeated until this situation occurs. In this case, the updating of the indication in step S70 is carried out only for a visual display as shown in FIG. 2b while, in the case of an audible message, the direction of travel information is announced only either when the driver requests this or when the direction to be followed changes.

As soon as the vehicle in FIG. 2a reaches the route $z_1$, a question is asked in step S80, following the step S20, as to whether the destination $Z_n$, has been reached. As long as this is not the case, the direction indication corresponding to the stored route is produced and the navigation method returns, in step S90, to step S10, in order to use the steps S10, S20, S80 and S90 to monitor the distance travelled by the vehicle along the route R, and to output to the driver the navigation instructions required in each case.

As soon as it is found in step S80 that the route destination has been reached, that is to say that the vehicle position z(t) corrresponds to the destination point $z_n$ (except for an error tolerance), an indication is produced in step S100 that the destination has been reached, in order then to end the method for this route R.

FIG. 3a shows a further example of a route R, in which case only the node $z_2$ is shown in addition to the starting and destination points $z_1$, $z_n$. In this case, the vehicle position $z(t)$ is located closer to the point $z_2$ than to the starting point $z_1$, of the route. The node $z_2$ is thus selected in step S40, in order to guide the vehicle to the route. The corresponding direction of travel instruction "straight on; 20 meters" is shown in FIG. 3b.

FIG. 4a shows the situation in which the vehicle has left the route. The vehicle is located at the position $z(t)$, from which the node $z_j$ is the nearest node on the route. As can be seen from FIG. 4a, it is better in terms of the shortest overall distance to guide the vehicle to the node $z_{j+1}$, since the distance between the nodes $z_j$ and $z_{j+1}$ is greater than the distance from the current vehicle position $z(t)$ to the node $z_{j+1}$.

The node $z_{j+1}$ is thus selected in step S40.

FIG. 4b shows the visual display of the direction of travel information "forwards half-right; 70 meters".

The last three detected vehicle positions, including the current vehicle position $z(t)$ are used, according to the invention, to determine the direction of travel of the vehicle. The vehicle positions may in this case be represented as coordinates in any suitable coordinate system. The individual positions, which are, in particular, GPS positions $z(t_i)$, are preferably represented as complex numbers in polar coordinates. The GPS positions are normally updated continually, for example every second.

Figure 6:
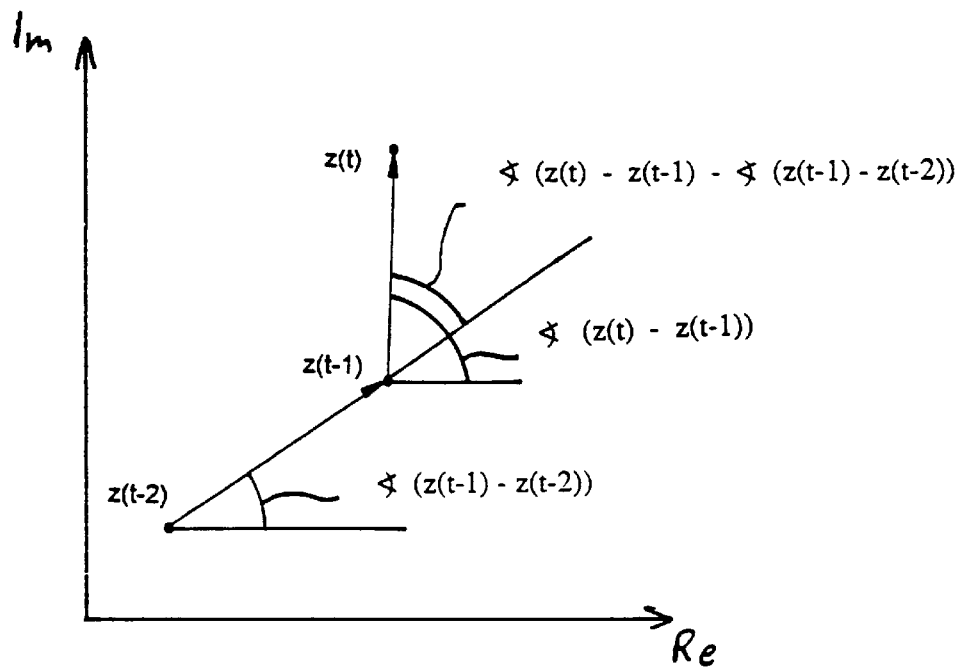
FIG. 6 shows a diagram to explain the estimation of the vehicle direction.

In order first of all to determine the direction of travel of the vehicle, the system finds out whether the direction of travel has changed by more than a tolerance value $\epsilon$ during the detection of the last three vehicle positions, that is to say, for example, in the last 2 to 3 seconds, in which case $\epsilon$ may be, for example, 5°. Thus, if the difference between the vector from $z(t-1)$ to $z(t)$ and the vector from $z(t-2)$ to $z(t-1)$ shown in FIG. 6 is less than the tolerance value $\epsilon$, that is to say if these two vectors are essentially pointing in the same direction, then the direction of the vector from $z(t-2)$ to $z(t)$ is assessed as being the mean direction of travel Fr. In order to find out whether the difference between the two vectors representing the direction of travel from $z(t-2)$ to $z(t-1)$ and from $z(t-1)$ to $z(t)$ is less than the predetermined tolerance value, their angles are subtracted from one another, and the absolute magnitude of the difference is compared with $\epsilon$. Thus, if the condition $$|\sphericalangle(z(t)-z(t-1))-\sphericalangle(z(t-1)-z(t-2))|<\epsilon$$

is satisfied, then the angle of the vector for the vehicle direction from $z(t-2)$ to $z(t)$, that is to say $\sphericalangle(z(t))-z(t-2))$, is regarded as the direction of travel.

Since definition of the direction of travel Fr is worthwhile only when a vehicle is travelling in a straight line, the determination of the vehicle direction is repeated after a waiting period if the condition mentioned above is not satisfied. In the simplest case, the waiting period may in this case be equal to the period for updating the vehicle positions. However, it is also conceivable to wait for a number of updates, for example three, before another attempt is made to find out the vehicle direction.

Figure 7:
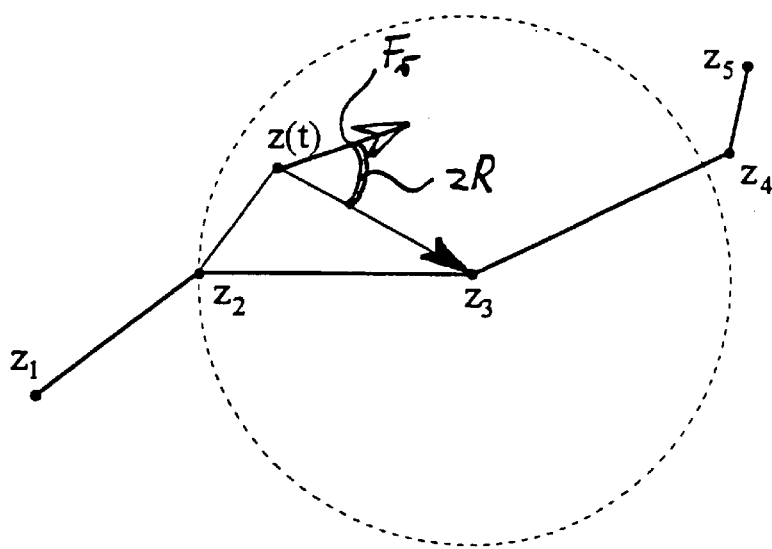
FIG. 7 shows a diagram to explain the selection of a node which is suitable for returning to the route.

The current vehicle position, as was determined in step S10, is then used in step S40 to select a node $z_j$ on the route R, to which the user is intended to be guided back. In order to select this node which is the best taking account of the shortest overall distance, that is to say the next junction, that node $z_j$ on the route R is first of all selected which is closest to the current vehicle position $z(t)$. As is illustrated in FIG. 7, which shows another example of a route, the node $z_2$ is located closest to the current vehicle position. Once the closest node, that is to say $z_2$ in this case, has been determined, the Euclidean distance between the closest node, that is to say $z_3$ in this case, and the node $z_2$ is compared with the Euclidean distance between the current vehicle position $z(t)$ and this subsequent node $z_3$. If the distance between the current vehicle position and the node $z_3$ is in this case less than its distance from the preceding node $z_2$, that is to say the equation $$|z(t)-z_{j+1}|<|z_j-z_{j+1}|$$

is satisfied, then, as is illustrated in FIG. 7, the node $z_3$ is selected for returning to the route. Otherwise, the node $z_2$ is used for the return.

Finally, the direction of travel Fr and the direction from the current vehicle position $z(t)$ to the node $z_3$ are used to calculate the direction zR (seen relative to the vehicle) back to the route, this being shown as an angle in FIG. 7.

Figure 8:
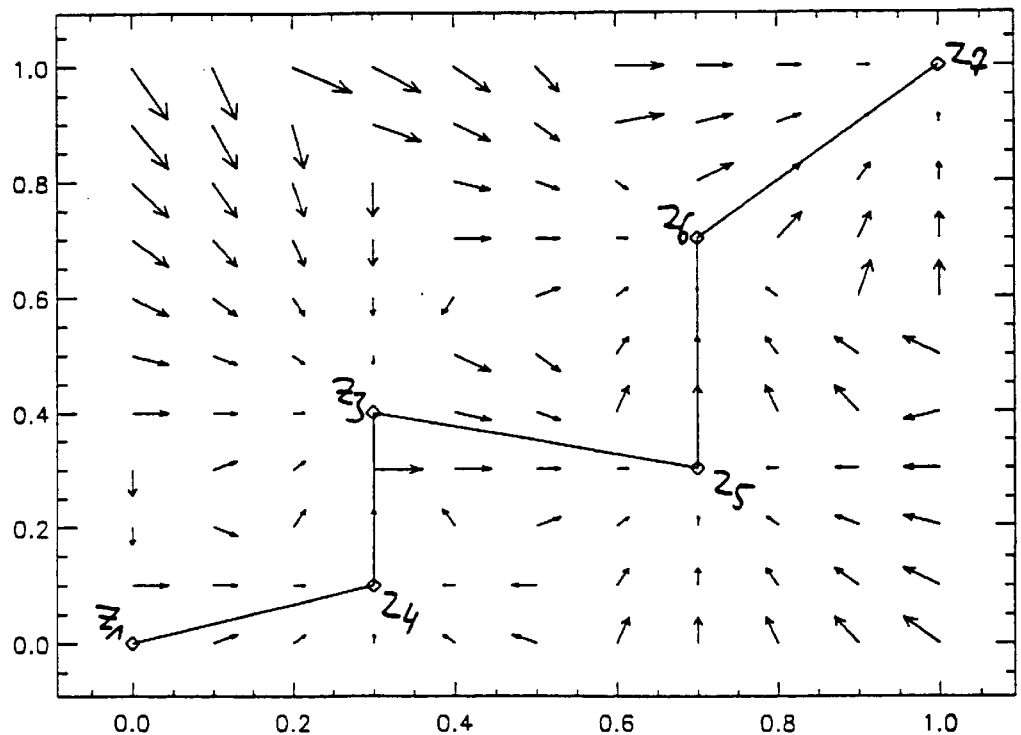
FIG. 8 shows a vector field which illustrates the direction information which leads back to the route, for selected positions on a grid network off the route.

FIG. 8 shows another route, having seven nodes. The absolute directions which lead back to the route are illustrated for this route for a large number of points that are not on the route, in which case these directions lead back to the route taking account of the shortest overall distance. In this case, the length of the individual direction vectors represents the distance to the respective best node $z_j$ on the route R.

The navigation method according to the invention thus makes it possible for a user to be guided to a desired destination along a route R determined using current map material, without the map material having to be available in the navigation device 10 that is used. It is thus possible to dispense with complex memory devices for the map material required for a navigation device for the navigation method according to the invention, so that the size of the navigation device can be reduced. Such a small structure of the navigation device is expedient not only for applications in vehicles but, furthermore, also allows portable navigation devices to be produced which can guide either a pedestrian in town or a person walking in the countryside reliably along a selected route to his destination.

What is claimed is:

1. Navigation method, in particular for leading a user in a vehicle back to a determined route without recalculating the route on the basis of necessary map material, comprising the steps of:

determining a route from a starting point to a destination;

storing the determined route;

determining the current position; and indicating direction information corresponding to the route if the current position is on the route, otherwise;

determining a first position on the route that is closest to the current position;

determining a second position on the route that follows the first position;

selecting the first position as suitable position for returning to the route if the distance from the current position to the second position is longer than the distance from the first position to the second position, otherwise selecting the second position as suitable position for returning to the route; and indicating the direction leading back to the route, wherein this direction is derived from the current position and the selected one of the first or second positions.

2. Navigation method according to claim 1, wherein the direction which leads back to the route is derived from the determined current position and stored data relating to the route.

3. Navigation method according to claim 2, wherein the direction which leads back to the route is indicated relative to the vehicle.

4. Navigation method according to claim 3, wherein the direction which leads back to the route is calculated, relative to the vehicle, from the direction of travel of the vehicle in the reference system of the route and from the direction from the current position to a selected position on the route.

5. Navigation method according to claim 4, wherein the direction of travel of the vehicle is estimated from the last, preferably from the last three, vehicle positions including the current vehicle position.

6. Navigation method according to claim 4, wherein, in order to estimate the direction of travel of the vehicle, the direction from the last but one vehicle position to the last vehicle position to the last vehicle position is compared with the direction from the last vehicle position to the current vehicle position, and in that the direction from the last but one vehicle position to the current vehicle position is used as the direction of travel provided the difference between the two directions which are compared with one another is not greater than a predetermined value.

7. Navigation method according to claim 2, wherein, in order to select, on the route, a position which is suitable for returning to the route, that stored position on the route is determined which is closest to the current position, the distance from the current position that position on the route which follows the closest position is compared with its distance to the closest position is closer to the following position than the current position, the closest position is selected, and otherwise the following position is selected.

8. Navigation method according to claim 1, wherein in addition to the direction which leads back to the route, the distance from the current position to the route is indicated, preferably the distance to a selected position on the route.

9. Navigation method according to claim 1, wherein the indication of the information which leads back to the route is continuously updated until the route is reached and, after this, the direction information corresponding to the route is indicated.

10. Navigation method according to claim 1, wherein the current direction information is output, if required, in response to a request signal from the user.

11. Navigation method according to claim 10, the individual nodes on the route are stored as GPS positions, and in that the current position is determined with the aid of a satellite-based position system.

12. Navigation method according to claim 1, the route is stored in the form of nodes which represent individual positions on a map, in particular road junctions, and to each of which a direction information item is assigned.

13. Navigation method according to claim 12, wherein the individual nodes on the route are displayed in polar coordinates, preferably as complex numbers in polar coordinates, preferably as complex numbers in polar coordinates.

14. Navigation method according to claim 1, wherein the starting point and destination of a desired route are entered, and are transmitted from a navigation device to a central data processing unit, in that appropriate map material is used in the central data processing unit to determine a route, and in that the determined route is transmitted to the navigation device requesting the route, and is stored there.

15. Navigation method according to claim 14, wherein the data are transmitted via a radio link, in particular via a data link in a cellular mobile radio network.

* * * * *